US012319268B2

(12) United States Patent
Kono et al.

(10) Patent No.: US 12,319,268 B2
(45) Date of Patent: Jun. 3, 2025

(54) TRAVELING CONTROL DEVICE FOR VEHICLE, TRAVELING CONTROL METHOD, AND STORAGE MEDIUM

(71) Applicant: TOYOTA JIDOSHA KABUSHIKI KAISHA, Toyota (JP)

(72) Inventors: Katsumi Kono, Toyota (JP); Yuuichi Kohara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 18/069,256

(22) Filed: Dec. 21, 2022

(65) Prior Publication Data

US 2023/0278540 A1 Sep. 7, 2023

(30) Foreign Application Priority Data

Mar. 2, 2022 (JP) .................... 2022-031916

(51) Int. Cl.
*B60W 20/13* (2016.01)
*B60L 58/10* (2019.01)
(Continued)

(52) U.S. Cl.
CPC ............. *B60W 20/13* (2016.01); *B60L 58/10* (2019.02); *B60W 10/06* (2013.01); *B60W 10/08* (2013.01);
(Continued)

(58) Field of Classification Search
CPC ...... B60W 20/13; B60W 10/06; B60W 10/08; B60W 30/182; B60W 40/10; B60W 40/12;
(Continued)

(56) References Cited

U.S. PATENT DOCUMENTS

| 9,248,756 B2 * | 2/2016 | Chen ..................... B60L 53/14 |
| 2008/0021628 A1 * | 1/2008 | Tryon .................. B60W 20/00 |
| | | 701/99 |

(Continued)

FOREIGN PATENT DOCUMENTS

| JP | 2001-314004 A | 11/2001 |
| JP | 2007-223357 A | 9/2007 |

(Continued)

*Primary Examiner* — Fadey S. Jabr
*Assistant Examiner* — Faris Asim Shaikh
(74) *Attorney, Agent, or Firm* — Oblon, McClelland, Maier & Neustadt, L.L.P.

(57) ABSTRACT

Provided is a traveling control device mounted on a vehicle equipped with an electric motor and an internal combustion engine as a power source. The traveling control device includes: a first acquisition unit that acquires a destination point of the vehicle; a second acquisition unit that acquires past traveling history from a departure point to the destination point; a third acquisition unit that acquires a target storage rate; an estimation unit that estimates, based on the traveling history, an expected amount of generative energy that is energy able to be generated in the vehicle until the vehicle arrives at the destination point; a setting unit that sets a first section and a second section based on the expected amount of the generative energy and the target storage rate; and a control unit that controls traveling of the vehicle based on the first section and the second section.

8 Claims, 10 Drawing Sheets

(51) Int. Cl.
  *B60W 10/06* (2006.01)
  *B60W 10/08* (2006.01)
  *B60W 30/182* (2020.01)
  *B60W 40/10* (2012.01)
  *B60W 40/12* (2012.01)
(52) U.S. Cl.
  CPC .......... *B60W 30/182* (2013.01); *B60W 40/10* (2013.01); *B60W 40/12* (2013.01)
(58) Field of Classification Search
  CPC ......... B60W 2552/20; B60W 2556/50; B60W 2710/244; B60W 20/15; B60W 20/12; B60W 40/00; B60L 50/16; B60L 58/10; B60L 7/10; B60L 2240/622; B60L 2240/642; B60L 2260/26; B60L 2260/44; B60L 15/2045; B60L 50/61; B60L 58/13; Y02T 10/62
  See application file for complete search history.

(56) References Cited

U.S. PATENT DOCUMENTS

| | | | |
|---|---|---|---|
| 2008/0262667 A1* | 10/2008 | Otabe | B60W 50/0097 701/22 |
| 2011/0022255 A1* | 1/2011 | Yamada | B60K 6/46 180/65.265 |
| 2011/0251744 A1* | 10/2011 | Amano | F02D 29/02 180/65.265 |
| 2012/0032637 A1* | 2/2012 | Kotooka | B60W 10/06 320/109 |
| 2013/0015860 A1* | 1/2013 | Crombez | H01M 10/44 320/137 |
| 2013/0066495 A1* | 3/2013 | Furuta | B60W 20/13 903/930 |
| 2013/0079962 A1* | 3/2013 | Ishikawa | B60L 15/2045 701/22 |
| 2015/0274028 A1* | 10/2015 | Payne | B60L 53/00 903/903 |
| 2017/0028981 A1* | 2/2017 | Ogawa | B60K 6/445 |
| 2017/0297555 A1* | 10/2017 | Jeong | B60W 10/08 |
| 2019/0322267 A1* | 10/2019 | Kurihashi | B60W 10/06 |
| 2021/0138909 A1 | 5/2021 | Tokura et al. | |
| 2023/0280168 A1* | 9/2023 | Kono | B60W 20/12 |
| 2023/0322111 A1* | 10/2023 | Okazaki | G08G 1/00 701/423 |

FOREIGN PATENT DOCUMENTS

| | | |
|---|---|---|
| JP | 2008-183937 A | 8/2008 |
| JP | 2009-29154 A | 2/2009 |
| JP | 4702086 B2 | 6/2011 |
| JP | 2021-75266 A | 5/2021 |

* cited by examiner

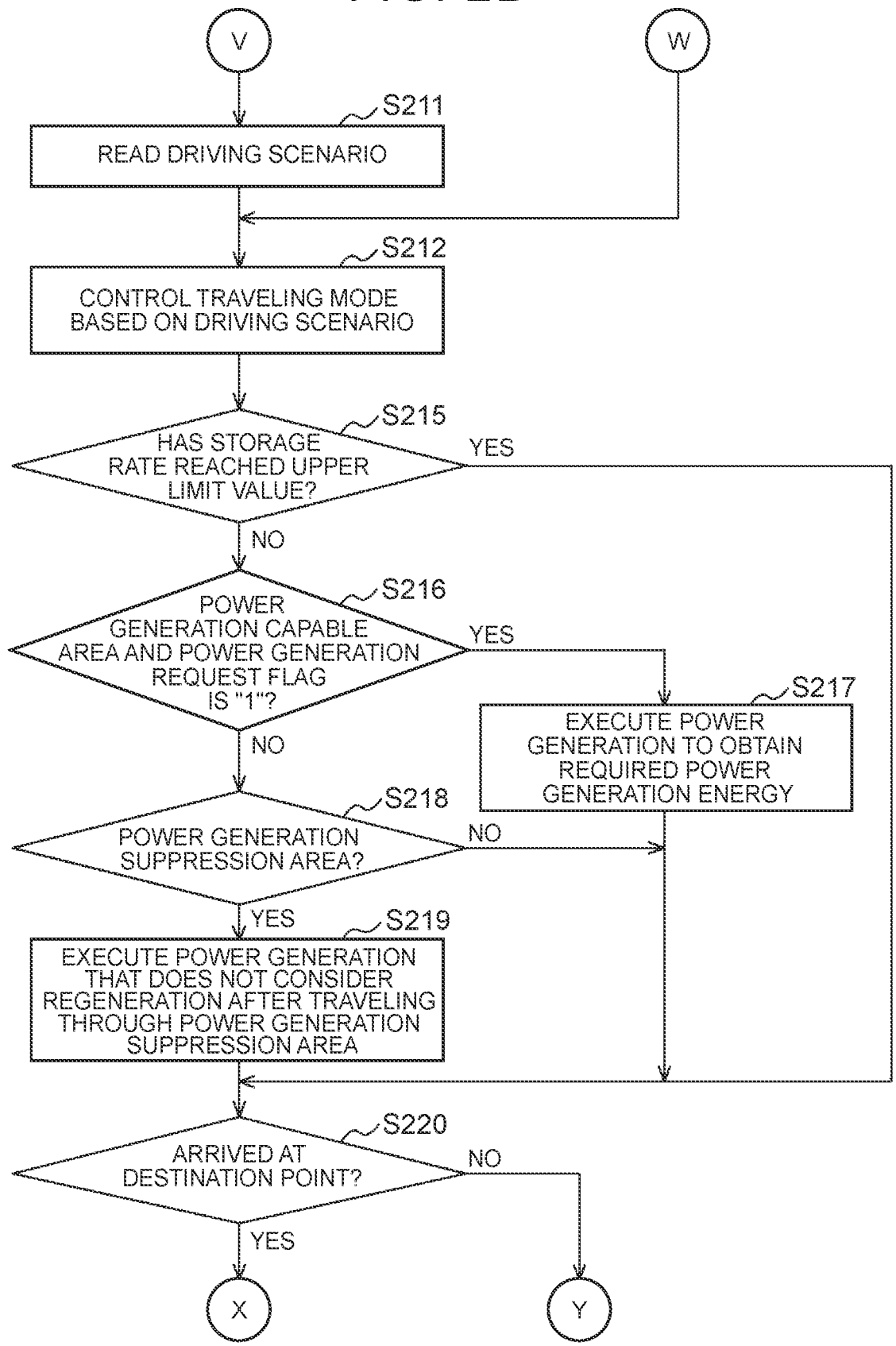

TRAVELING CONTROL DEVICE FOR VEHICLE, TRAVELING CONTROL METHOD, AND STORAGE MEDIUM

CROSS-REFERENCE TO RELATED APPLICATION

This application claims priority to Japanese Patent Application No. 2022-031916 filed on Mar. 2, 2022, incorporated herein by reference in its entirety.

BACKGROUND

1. Technical Field

The present disclosure relates to a traveling control device mounted on a vehicle and the like.

2. Description of Related Art

In a hybrid electric vehicle equipped with an electric motor and an internal combustion engine, fuel consumption can be improved through traveling control that efficiently uses both the electric motor and the internal combustion engine.

Japanese Patent No. 4702086 (JP 4702086 B) discloses a vehicle driving assistance device that notifies the driver of the braking start point where the regenerative braking operation needs to be initiated, based on the vehicle's position and map information of the necessary stopping points or necessary decelerating points such as railroad crossings and curves. In this vehicle driving assistance device, the driver is encouraged to apply the regenerative brake at a deceleration level that allows efficient recovery of regenerative energy, thereby increasing the amount of regenerative energy recovered.

SUMMARY

In the technology described in JP 4702086 B, it is possible to predict the point at which regenerative energy can be expected to be recovered, but the amount of regenerative energy recovered cannot be predicted quantitatively. Therefore, if the amount of regenerative energy recovered can be predicted quantitatively at an early stage, the energy that can be generated in the vehicle, including this regenerative energy, can be effectively estimated and may be used for suitable traveling control.

The present disclosure has been made in view of the above issue, and an object of the present disclosure is to provide a traveling control device for a vehicle or the like, which can predict the energy that can be generated in a vehicle, including a quantitative amount of regenerative energy recovered, and use it for traveling control.

To solve the above issue, an aspect of the disclosed technology is a traveling control device mounted on a vehicle equipped with an electric motor and an internal combustion engine as a power source. The traveling control device includes: a first acquisition unit that acquires a destination point of the vehicle; a second acquisition unit that acquires past traveling history from a departure point to the destination point; a third acquisition unit that acquires a target storage rate that is a storage rate of a battery installed in the vehicle to be targeted at a time of arrival of the vehicle at the destination point; an estimation unit that estimates, based on the traveling history, an expected amount of generative energy that is energy able to be generated in the vehicle until the vehicle arrives at the destination point; a setting unit that sets a first section and a second section based on the expected amount of the generative energy and the target storage rate, the first section being a section in which only the electric motor is driven for traveling, and the second section being a section in which at least the internal combustion engine is driven for traveling; and a control unit that controls traveling of the vehicle based on the first section and the second section.

According to the traveling control device for a vehicle of the present disclosure, it is possible to estimate the expected amount of energy that can be generated in the vehicle using the traveling history based on past vehicle traveling, and to realize suitable traveling control that takes into account the target storage rate of the battery based on the expected amount of energy that has been estimated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2B is a flowchart of an example of the traveling control process executed by the traveling control device;

DETAILED DESCRIPTION OF EMBODIMENTS

A traveling control device according to the present embodiment quantitatively estimates energy that can be generated in a vehicle at an early stage using a traveling power profile and a speed profile. The traveling power profile is a time series of changes in traveling power generated by a power source expected in traveling from a departure point to a destination point, and the speed profile is a time series of changes in vehicle speed. This makes it possible to use the results of this estimation to provide suitable traveling control that takes into account the target storage rate of the battery. Hereinafter, the embodiment of the present disclosure will be described with reference to the drawings.

Embodiments

Configuration

Figure 1:
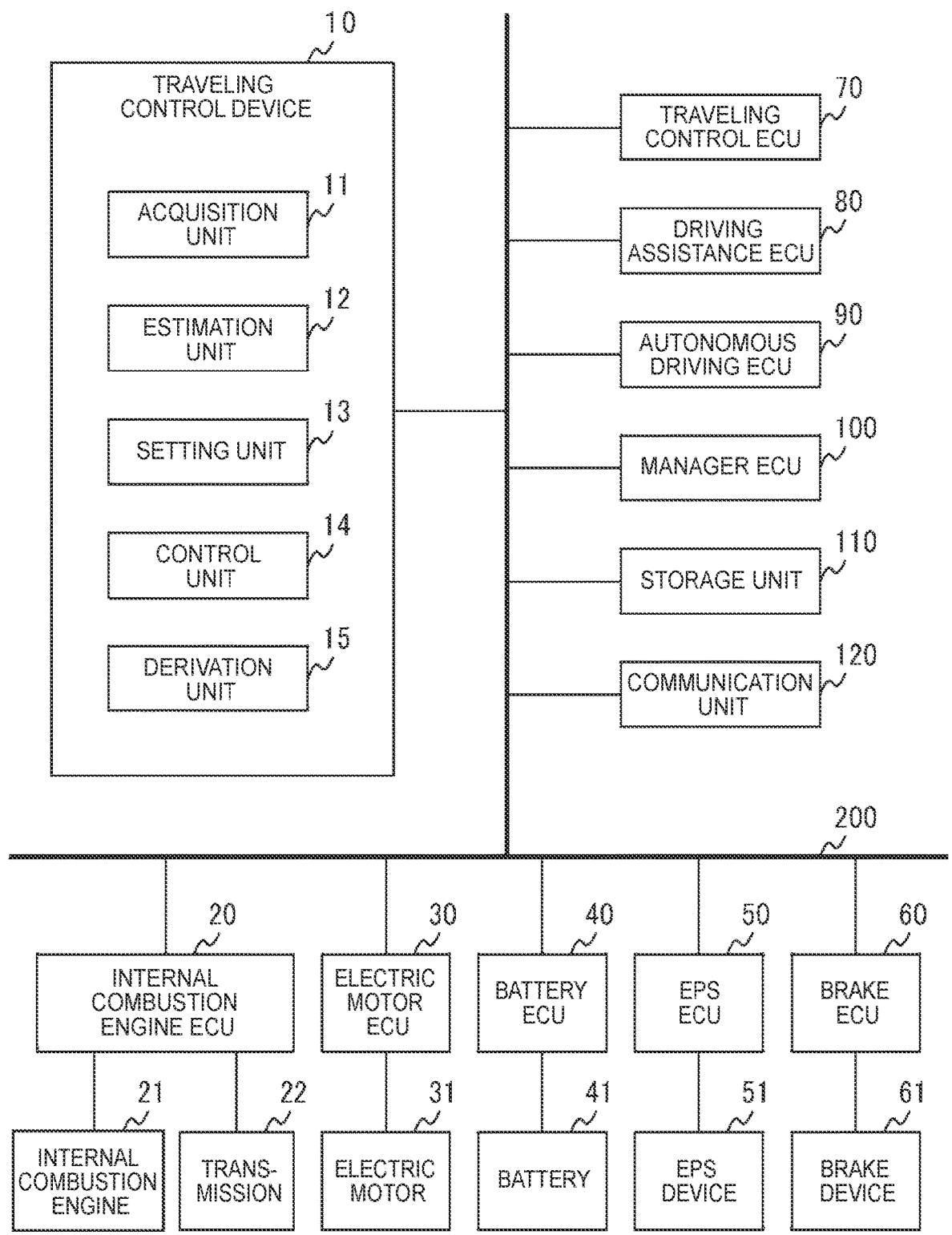
FIG. 1 is a functional block diagram of a traveling control device and its peripheral components according to an embodiment of the present disclosure.

FIG. 1 is a diagram showing functional blocks of a traveling control device 10 according to the embodiment of the present disclosure and peripheral components thereof. The traveling control device 10 is mounted on a vehicle. As illustrated in FIG. 1, in addition to the traveling control device 10, the vehicle is equipped with configurations including an internal combustion engine electronic control unit (ECU) 20, an internal combustion engine 21, a transmission 22, an electric motor ECU 30, an electric motor 31, a battery ECU 40, a battery 41, an electric power steering (EPS) ECU 50, an EPS device 51, a brake ECU 60, a brake device 61, a traveling control ECU 70, a driving assistance ECU 80, an autonomous driving ECU 90, a manager ECU 100, a storage unit 110, and a communication unit 120. The traveling control device 10 is connected to these configurations via an in-vehicle network 200 such as Controller Area Network (CAN) or Ethernet (registered trademark) so as to be able to communicate with each other.

In addition to the above-mentioned configurations, various sensors such as an accelerator pedal sensor, a brake pedal sensor, a camera and other obstacle sensors, a vehicle speed sensor, a yaw rate sensor, and a global positioning system (GPS) sensor, as well as a variety of devices such as navigation systems, can be mounted on the vehicle, but are not shown in the figures in the present disclosure.

The internal combustion engine 21 and the electric motor 31 are actuators (ACTs) that serve as power sources to drive the vehicle. The electric motor 31 is also a generator that generates electric power by regenerative braking during decelerated traveling and downhill traveling of the vehicle, and a braking device that generates braking force.

The internal combustion engine ECU 20 is an electronic control unit (ECU) that controls the internal combustion engine 21 and the transmission 22, which changes the rotation speed between input and output, to perform control to generate drive torque and braking torque by engine braking.

The electric motor ECU 30 is an electronic control unit that controls the electric motor 31 to perform control to generate drive torque and braking torque by regenerative braking.

The battery 41 is a rechargeable secondary battery (e.g., lithium-ion battery, nickel-hydrogen battery, and lead-acid battery) that can supply electric power to the electric motor 31 and other devices by discharging, and that can charge electric power (recovered energy) obtained by regenerative braking of the electric motor 31 or electric power (generated energy) obtained by power running operation using the internal combustion engine 21. The battery ECU 40 is an electronic control unit that controls the charging and discharging of electric power of the battery 41.

The electric power steering (EPS) device 51 is an actuator that steers the vehicle by changing the steering angle of wheels to change the traveling direction of the vehicle. The EPS ECU 50 is an electronic control unit that controls the EPS device 51.

The brake device (foot brake device) 61 is an actuator that generates braking force by frictional force against a member rotating with the wheels. The brake ECU 60 is an electronic control unit that controls the brake device 61.

The traveling control ECU 70 is an electronic control unit that controls the internal combustion engine ECU 20 and the electric motor ECU 30 in accordance with the traveling mode described below.

The driving assistance ECU 80 is an electronic control unit that executes various functions such as collision avoidance (PCS), preceding vehicle following (ACC), lane keeping (LKA), lane departure warning (LDW), and the like to assist driving of the vehicle. The driving assistance ECU 80 outputs instructions to control the motion of the vehicle, such as acceleration/deceleration and steering angles, based on vehicle information acquired from various sensors and the like. The functions and the number of the driving assistance ECUs 80 are not limited.

The autonomous driving ECU 90 is an electronic control unit that executes the functions of autonomous driving. The autonomous driving ECU 90 outputs instructions to control the motion of the vehicle, such as acceleration/deceleration and steering angles, based on vehicle information acquired from various sensors and the like in order to execute the functions of autonomous driving.

The manager ECU 100 is an electronic control unit that gives instructions to the EPS ECU 50, the brake ECU 60, the traveling control ECU 70, and the like (hereinafter collectively referred to as "actuator ECUs") based on instructions from the driving assistance ECU 80, the autonomous driving ECU 90, and the like. For example, the manager ECU 100 gives instructions on acceleration to the traveling control ECU 70, instructions on steering to the EPS ECU 50, and instructions on deceleration to the traveling control ECU 70 and the brake ECU 60.

When the manager ECU 100 receives instructions from multiple driving assistance ECUs 80 and the like, the manager ECU 100 performs a process called arbitration based on predetermined rules to determine which of the instructions to use to control the vehicle. Based on the results of the arbitration, the manager ECU 100 gives instructions to the actuator ECUs. The driving operations manually performed by the driver, such as operations of the steering wheel, the brake pedal, and the accelerator pedal, may be acquired by the manager ECU 100 to be subject to the arbitration process by the manager ECU 100, or otherwise may be acquired by the actuator ECUs so that the actuator ECUs separately arbitrate between the driver's manual driving operations and the instructions from the manager ECUs 100.

The storage unit 110 stores traveling history related to the vehicle. One of the traveling histories is the history of when the vehicle was driven in the past, and is information on the traveling power generated by the power sources (internal combustion engine 21 and electric motor 31) at each point in time during which the vehicle was driven. The traveling power consists of the drive power of the internal combustion engine 21, the drive power of the electric motor 31, and the absorbed power of the electric motor 31. Another one of the traveling histories is information on the speed (vehicle speed) of the vehicle at each point in time during the period in which the vehicle was driven in the past. This traveling history can be generated, for example, by periodically storing in the storage unit 110 the traveling power and the vehicle speed derived and obtained based on various sensors and the like mounted on the vehicle while the vehicle's power system (not shown) is on. The storage unit 110 may be part of a car navigation system (not shown) installed in the vehicle, for example.

The communication unit 120 can perform wireless communication with servers outside the vehicle and other vehicles that are not shown, and can receive traveling histories other than drivers obtained based on the traveling results of the other vehicles.

The traveling control device 10 is an electronic control unit (ECU) that controls traveling of the vehicle. The traveling control device 10 includes configurations of an acquisition unit 11, an estimation unit 12, a setting unit 13, a control unit 14, and a derivation unit 15.

The acquisition unit 11 acquires information on the vehicle's destination point, the traveling history from the departure point to the destination point, and the target storage rate of the battery 41 at the time of arrival at the destination point (a first acquisition unit, a second acquisition unit, and a third acquisition unit). The estimation unit 12 estimates the expected amount of generative energy, which is the energy that can be generated in the vehicle, based on each piece of information acquired by the acquisition unit 11. The setting unit 13 sets a section in which the electric motor 31 is used for traveling and a section in which the internal combustion engine 21 is used for traveling, based on the expected amount of generative energy estimated by the estimation unit 12 and the target storage rate. The control unit 14 controls traveling of the vehicle based on the sections set by the setting unit 13. The derivation unit 15 derives the deviation between the traveling power based on the traveling history and the actual traveling power.

Each of the above mentioned ECUs is typically composed of a computer with a memory, a processor, and an interface. The processor in each ECU, for example, reads and executes a program stored in a non-transitory memory to realize each function. These ECUs are connected to each other by communication lines and can operate cooperatively by communicating with each other as appropriate.

The configurations of the devices mounted on the vehicle and the configuration of the traveling control device 10 described above are examples, and can be added, replaced, changed, or omitted as appropriate. The functions of each device can be integrated into a single device or distributed across multiple devices as appropriate.

For example, the traveling control device 10 may be provided as an independent ECU, may be provided as a part of the manager ECU 100, the traveling control ECU 70 or the like, or the functions of the traveling control device 10 may be distributed among the manager ECU 100, the traveling control ECU 70, or the like.

Also, for example, the traveling control device 10, the traveling control ECU 70, the driving assistance ECU 80, the autonomous driving ECU 90, and the manager ECU 100 may be provided as a single ECU. Further, for example, the autonomous driving ECU 90 does not have to be provided in the vehicle.

Controls and Processes

FIGS. 2A, 2B, 3A, 3B, and 4 will be further referenced below to explain in detail an example of the controls and processes performed by the traveling control device 10 according to the present embodiment.

Figure 2A:
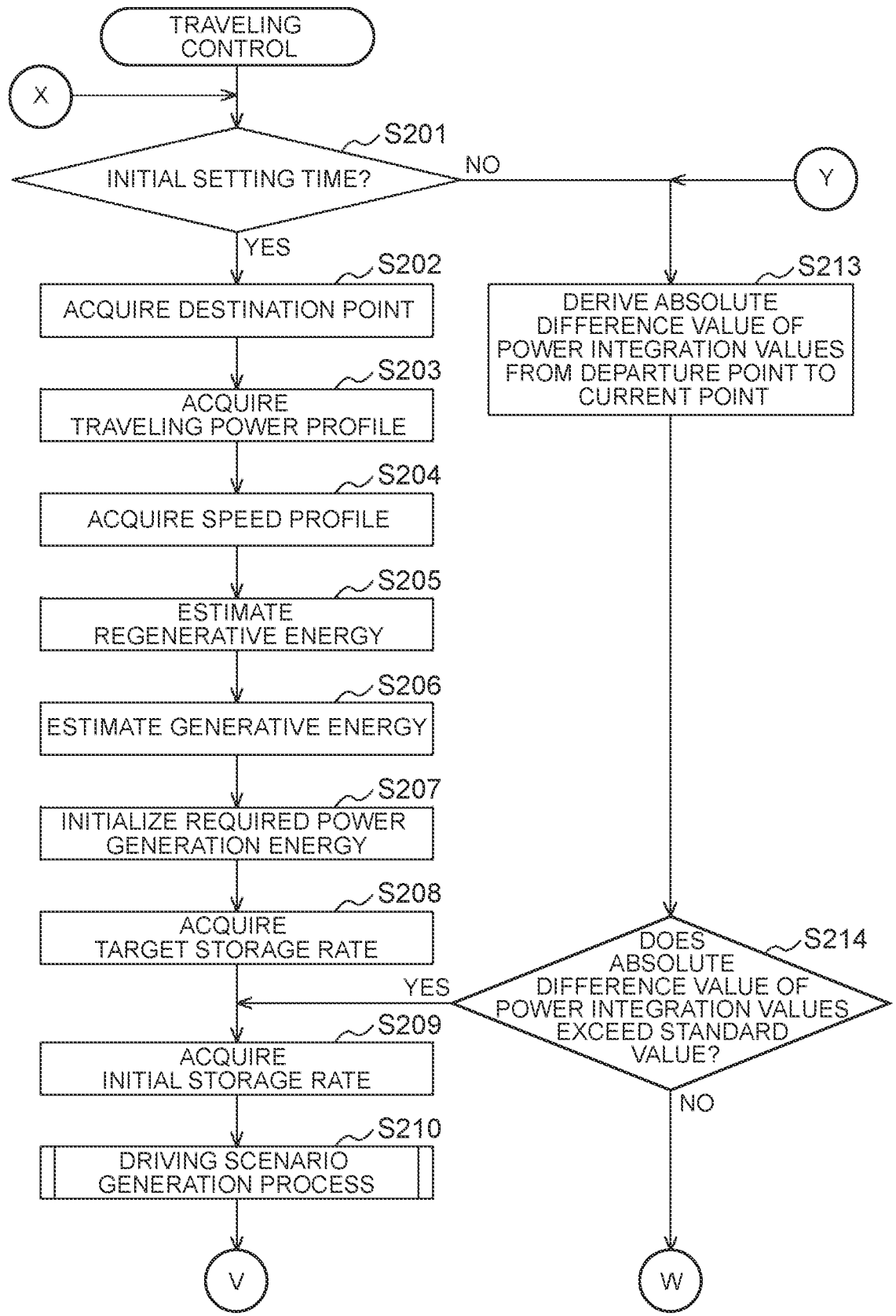
FIG. 2A is a flowchart of an example of a traveling control process executed by the traveling control device.

FIGS. 2A and 2B are flowcharts showing an example of the traveling control executed by the traveling control device 10. The processes of FIG. 2A and the processes of FIG. 2B are connected by connectors V, W, X, and Y. This traveling control starts, for example, when the driver or the like turns on the vehicle's power system and starts the trip, and continues its execution until the vehicle's power system is turned off and the trip is terminated.

Step S201

The control unit 14 determines whether the timing is the initial setting time in which control of the traveling mode based on the driving scenario has not yet started. When the timing is the initial setting time (S201: YES), the process proceeds to step S202, and when the timing is not the initial setting time (S201: NO), the process proceeds to step S213.

Step S202

The acquisition unit 11 acquires the destination point. The destination point is given, for example, by latitude/longitude information. The destination point is the end point where the vehicle ends its trip or any intermediate point set along the route to this end point. The acquisition unit 11 may acquire the destination point via manual input by the driver or the like of the vehicle, or may acquire the destination point via automatic input by the vehicle's onboard navigation system, remote control from a management center outside the vehicle, or the like. As the method for automatically acquiring the destination point, the destination point may be acquired based on the current position, date, time, day of the week, etc., before the start of traveling, or may be acquired based on the vehicle's traveling direction, etc., after the start of the traveling. Once the destination point is acquired, the process proceeds to step S203.

Step S203

Figure 5:
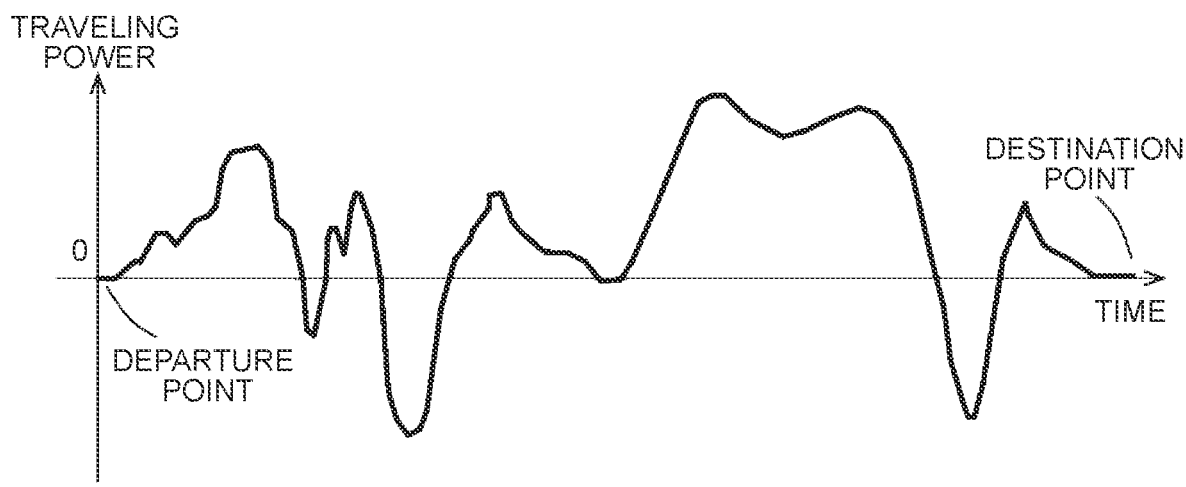
FIG. 5 is a diagram showing an example of a traveling power profile.

The acquisition unit 11 acquires a traveling power profile. The traveling power profile is power information that indicates a time series of changes in the traveling power generated by the power sources (internal combustion engine 21 and electric motor 31) at each point in time that are expected to occur during traveling from the vehicle's departure point (current location) to the destination point. FIG. 5 is a diagram showing an example of the traveling power profile. In FIG. 5, the elapsed time from the start of traveling is taken on the horizontal axis and the traveling power on the vertical axis. The traveling power profile acquired by the acquisition unit 11 is generated (or extracted) based on, for example, the information stored in the storage unit 110, i.e., the past traveling histories from the departure point to the destination point along the same route.

A simple example of generation is described below. For example, when the route from the departure point to the destination point is a commuting route that is traveled at approximately the same time of day and along the same route, the multiple past traveling histories stored for this commuting route are expected to have approximately the same pattern of changes in the traveling power generated at the power source. In this case, the traveling power profile can be generated based on any one of the multiple past traveling histories. Furthermore, when attributes such as the day of the week or time of day when the vehicle was driven are provided in the traveling histories, the traveling power profile may be generated based on the traveling history with the highest number of attributes that match the current traveling. When the navigation system installed in the vehicle creates a traveling route from the departure point to the destination point, the traveling power profile may be generated based on the traveling history that has a high degree of similarity with this traveling route.

When there are multiple traveling histories that are candidates for the traveling power profile, for example, any one of them may be used as the traveling power profile, or the traveling power profile may be an average of the multiple traveling histories. If the traveling history is vehicle information (e.g., vehicle speed) other than power information indicating a times series of changes in the traveling power generated at the power source during traveling, the traveling power profile may be generated based on the vehicle information. The method for generating the traveling power profile is not limited, and each of the above methods may be combined as appropriate. Once the traveling power profile is acquired, the process proceeds to step S204.

Step S204

Figure 7:
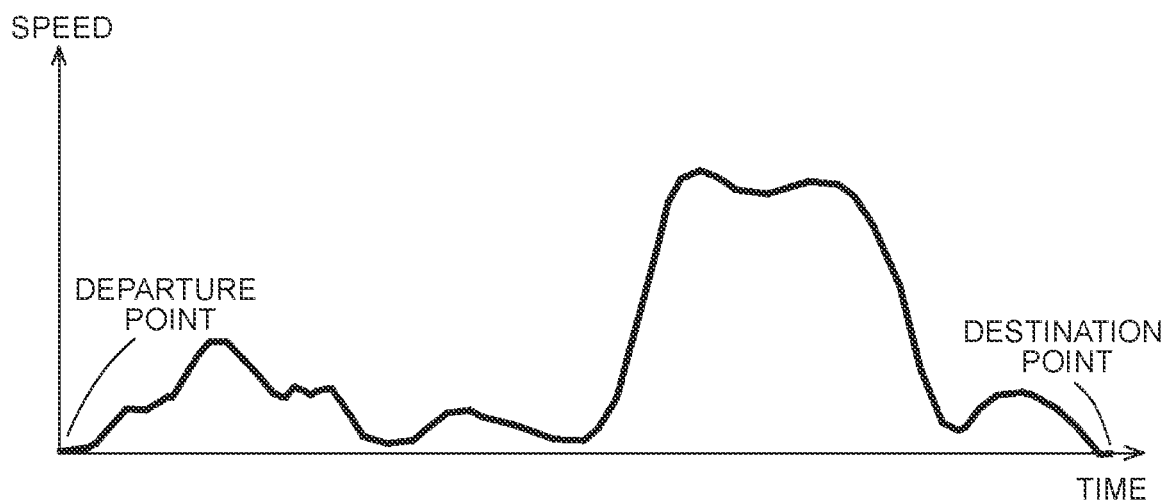
FIG. 7 is a diagram showing an example of a speed profile.

The acquisition unit 11 acquires a speed profile. The speed profile is information indicating a time series of the vehicle's expected speed at each point in time in traveling from the vehicle's departure point (current location) to the destination point. FIG. 7 is a diagram showing an example of the speed profile. In FIG. 7, the elapsed time from the start of traveling is taken on the horizontal axis and the vehicle's speed on the vertical axis.

The speed profile acquired by the acquisition unit 11 is generated (or extracted) based on, for example, the information stored in the storage unit 110, i.e., the past traveling histories from the departure point to the destination point along the same route. In a simple example, if the only traveling pattern of a driver (vehicle) is to travel the same route at the same time of day on weekdays for commuting, the pattern of change over time in the speed in the traveling histories is expected to be approximately the same. In such cases, the acquisition unit 11 may create a speed profile based on one of the past traveling histories.

Further, the storage unit 110 may classify and store the traveling histories with corresponding attributes such as the day of the week and time of day, and the acquisition unit 11 may create a speed profile based on the traveling history with the highest number of matches with the day of the week, time of day, and other attributes for the current traveling. Once the speed profile is acquired, the process proceeds to step S205.

Step S205

Figure 6:
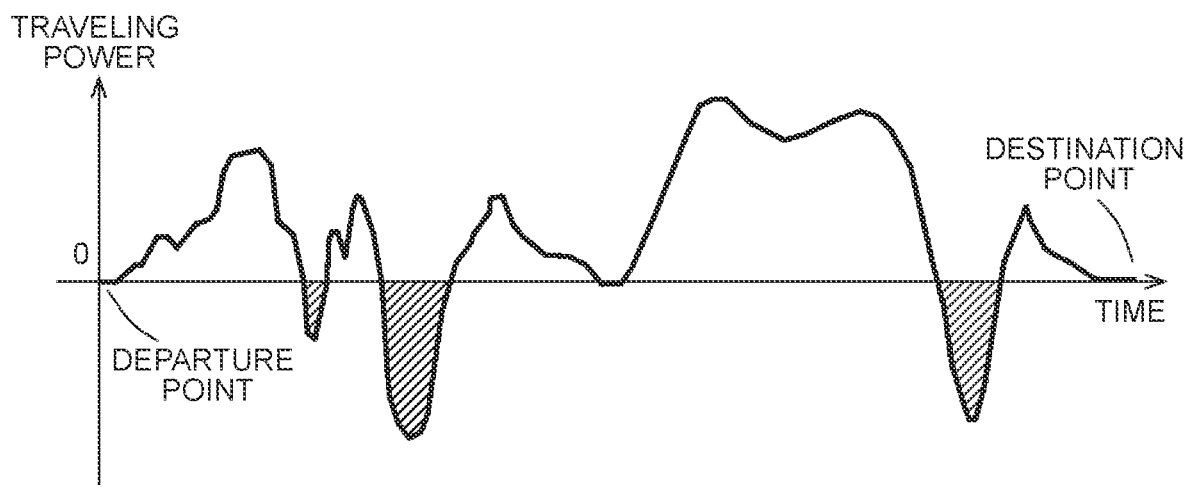
FIG. 6 is a diagram showing a regenerative energy area in the traveling power profile.

The estimation unit 12 estimates the regenerative energy E_est, which is the electrical energy obtained by regenerative braking of the electric motor 31 during vehicle traveling from the departure point to the destination point. The estimation of the regenerative energy E_est is performed based on the traveling power profile. Specifically, the period when the traveling power is negative (less than zero) in the traveling power profile is the period when it is expected that the regenerative energy can be recovered (recovery period), and the time-integrated value of the magnitude of the traveling power during this recovery period, i.e., the hatched area in FIG. 6 is calculated as the estimated regenerative energy E_est. In estimating the regenerative energy E_est, the estimated value may be corrected in consideration of variable factors such as increased vehicle weight due to cargo loading, inclement weather, etc. Once the regenerative energy E_est is estimated, the process proceeds to step S206.

It is conceivable that the traveling power profile stored in the storage unit 110 as the past traveling history described above may be approximate data rather than actual data due to limitations on the memory amount of the storage unit 110. In such a case, to improve the accuracy of estimating the regenerative energy E_est, the accumulated negative values of the traveling power may be stored as the traveling history separately from the traveling power profile.

Step S206

Figure 8:
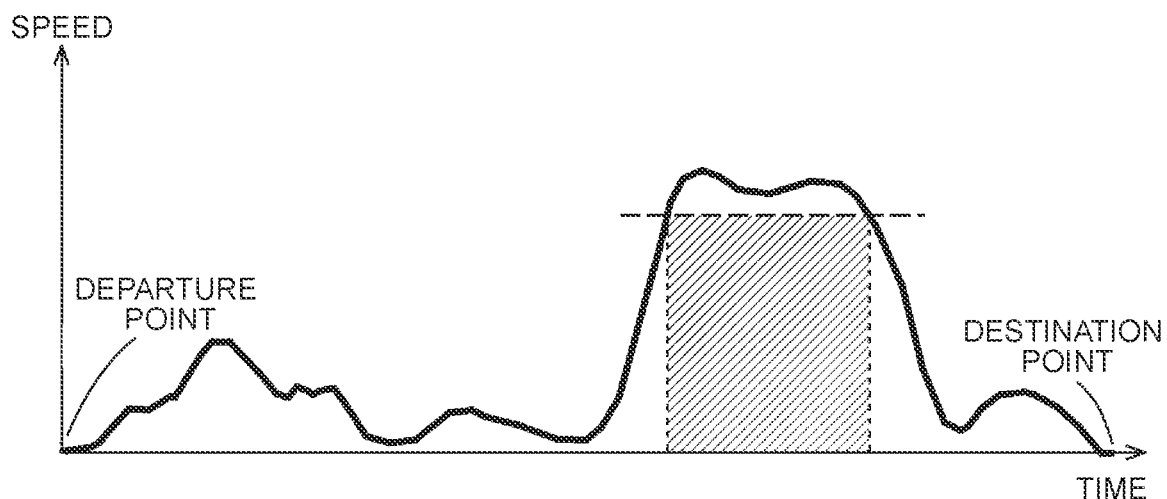
FIG. 8 is a diagram showing an area where electric power can be generated in the speed profile.

The estimation unit 12 estimates the generative energy E_gen, which is the electrical energy obtained by high-efficiency power generation during high-speed vehicle traveling from the departure point to the destination point. The estimation of the generative energy E_gen is performed based on the speed profile. Specifically, the period of high-speed traveling when the speed of the vehicle is a predetermined speed (e.g., 100 km/h) or more in the speed profile is the period when the efficiency of the internal combustion engine 21 is expected to be high (power generation period). The amount of electric power that can be generated during this power generation period, i.e., the hatched period in FIG. 8, is calculated as the estimated generative energy E_gen. In estimating the generative energy E_gen, the estimated value may be corrected in consideration of variable factors such as increased vehicle weight due to cargo loading, inclement weather, etc. Once the generative energy E_gen is estimated, the process proceeds to step S207.

Step S207

The setting unit 13 initializes the required power generation energy E_req by setting it to zero "0". The required power generation energy E_req is a variable that indicates how much electrical energy (amount of electric power) should be obtained through forced power generation at high-speed traveling of the vehicle, and is determined in the process of generating the driving scenario described below. Once the required power generation energy E_req is initialized to zero, the process proceeds to step S208.

Step S208

The acquisition unit 11 acquires the target storage rate SOC_tgt. The target storage rate SOC_tgt is the state of charge (SOC) of the battery 41 to be targeted at the time of arrival of the vehicle at the destination point, and can be the storage rate of the battery 41 desired by the driver of the vehicle, the system, or the like. The acquisition unit 11 may acquire the target storage rate SOC_tgt via manual input by the driver or the like of the vehicle, or may acquire the target storage rate SOC_tgt via automatic input by the vehicle's onboard navigation system, remote control from a management center outside the vehicle, or the like.

For example, if the destination point is a home with charging facilities, the battery 41 can be charged after returning home, so the target storage rate SOC_tgt may be set lower than the standard value. If a large amount of electric power is planned to be used at the destination point (e.g., at home), the target storage rate SOC_tgt may be set higher than the standard value. Once the target storage rate SOC_tgt is acquired, the process proceeds to step S209.

Step S209

The acquisition unit 11 acquires an initial storage rate SOC_stt. The initial storage rate SOC_stt is the storage rate of the battery 41 when the driving scenario is attempted to be generated. When it is determined that the timing is the initial setting time in step S201 described above, the initial storage rate SOC_stt is the storage rate of the battery 41 at the time of the start of traveling to generate the driving scenario for the first time, and when it is determined that the timing is not the initial setting time in step S201 described above, the initial storage rate SOC_stt is the storage rate of the battery 41 at the midpoint of traveling (intermediate point) where the driving scenario is generated again. The acquisition unit 11 can acquire the initial storage rate SOC_stt of the battery 41 from the battery ECU 40 or the like. Once the initial storage rate SOC_stt is acquired, the process proceeds to step S210.

Step S210

The setting unit 13 performs the process of generating the driving scenario (driving scenario generation process). The driving scenario is information that sets, in time series, threshold values for dividing the route from the current point to the destination point into a section where the vehicle travels using only the electric motor 31 (hereinafter referred to as a "first section") and a section where the vehicle travels using at least the internal combustion engine 21 (hereinafter referred to as a "second section"). The driving scenario generation process will be described below. Once the driving scenario is generated, the process proceeds to step S211.

Step S211

The control unit 14 reads the driving scenario generated by the driving scenario generation process. Once the driving scenario is read, the process proceeds to step S212.

Step S212

The control unit 14 controls the traveling mode of the vehicle based on the driving scenario. More specifically, the control unit 14 determines the section where the magnitude of the traveling power is equal to or less than the threshold value of the driving scenario as the first section, and the section where the magnitude of the traveling power exceeds the threshold value of the driving scenario as the second section. In the first section, the control unit 14 selects the "electric motor mode" in which only the electric motor 31 is driven as the traveling mode, and notifies the traveling control ECU 70. In response to this notification, the traveling control ECU 70 causes the electric motor ECU 30 to control traveling by the electric motor 31. In the second section, the control unit 14 selects, for example, the "internal combustion engine mode" in which only the internal combustion engine 21 is driven as the traveling mode, and notifies the traveling control ECU 70. In response to this notification, the traveling control ECU 70 causes the internal combustion engine ECU 20 to control traveling by the internal combustion engine 21.

In the electric motor mode, regenerative braking is performed by the electric motor 31 to recover the vehicle's kinetic energy as electric power. When the driver depresses the brake pedal to a large extent or the driving assistance ECU 80 gives instructions for rapid deceleration with a high priority to avoid a collision, etc., and a certain degree or more of deceleration is required, in order to generate sufficient braking force, the manager ECU 100 and the brake ECU 60 perform control so that the brake device 61 generates the braking force.

The above embodiment describes an example in which the traveling mode in the second section of the driving scenario is set to the internal combustion engine mode in which only the internal combustion engine 21 is driven for traveling. However, since the storage rate of the battery 41 is controlled to be almost constant in hybrid traveling, instead of the internal combustion engine mode, the "hybrid mode" in which at least the internal combustion engine 21 is driven for traveling may be selected as the traveling mode for the second section.

Step S213

The derivation unit 15 derives the absolute difference value $E\_d(t)$ of the power integration values from the departure point (t=0) to the current point (t=T). The absolute difference value $E\_d(t)$ of the power integration values is an absolute value of the difference between the integration value $\Sigma P\_present(t)$ of the magnitude of the traveling power obtained by actual traveling of the vehicle and the integration value $\Sigma P\_past(t)$ of the magnitude of the traveling power calculated based on the traveling power profile, as shown in equation [1] below. The absolute difference value $E\_d(t)$ of the power integration values is derived, for example, at a fixed period after the vehicle leaves the departure point. Once the absolute difference value $E\_d(t)$ of the power integration values is derived, the process proceeds to step S214.

$$E\_d(t)=|\Sigma P\_past(t)-\Sigma P\_present(t)|\ldots \qquad [1]$$

Step S214

The control unit 14 determines whether the absolute difference value $E\_d(t)$ of the power integration values, which is derived by the derivation unit 15, exceeds a standard value C. This determination is made to reconsider whether the driving scenario needs to be revised. Therefore, the standard value C is set to an appropriate predetermined value that allows determination that the driving scenario needs to be regenerated due to the fact that, for example, changes in the traveling power based on the driving scenario generated at the departure point deviate significantly from the traveling power profile set based on the past traveling history. When the absolute difference value $E\_d(t)$ of the power integration values exceeds the standard value C ($E\_d(t)>C$) (S214: YES), the process proceeds to step S209 to regenerate the driving scenario. On the other hand, when the absolute difference value $E\_d(t)$ of the power integration values does not exceed the standard value C ($E\_d(t) \leq C$) (S214: NO), the process proceeds to step S212 to continue the traveling mode control based on the current driving scenario.

Step S215

The control unit 14 determines whether the storage rate of the battery 41 has reached an upper limit value. This upper limit value can be, for example, the storage rate at which the battery 41 is allowed to be overcharged. When the storage rate of battery 41 has reached the upper limit value (S215: YES), the process proceeds to step S220. On the other hand, when the storage rate of the battery 41 has not reached the upper limit value (S215: NO), the process proceeds to step S216.

Step S216

The control unit 14 determines whether the vehicle is in a traveling condition in a power generation capable area and a power generation request flag XF is set to "1". This determination is made to determine whether the condition of the vehicle meets the condition for performing forced power generation. The power generation capable area is an area in which the vehicle is traveling at a high speed (e.g., 100 km/h or more) at which the internal combustion engine 21 can be used at a high efficiency and efficient power generation can be performed in the internal combustion engine mode. The power generation request flag XF is a flag indicating whether the amount of power generation needs to be intentionally (forcibly) increased between the departure point and the destination point, and is set to "1" or "0" as necessary in the process of generating the driving scenario described below. When the vehicle is in the power generation capable area and the power generation request flag XF=1 (S216: YES), the process proceeds to step S217. On the other hand, when the vehicle is not in the power generation capable area or the power generation request flag XF≠1 (S216: NO), the process proceeds to step S218.

Step S217

The control unit 14 executes power generation using the electric motor 31 or other generators (not shown) so as to obtain the required power generation energy E_req determined in the process of generating the driving scenario described below. Once power generation is executed to obtain the required power generation energy E_req, the process proceeds to step S220.

Step S218

The control unit 14 determines whether the vehicle is traveling in a power generation suppression area. The power generation suppression area is an area in which a large amount of electrical energy is expected to be recovered after that area. Examples of the power generation suppression area include a predetermined section on a highway prior to an exit interchange where regenerative energy can be expected to be generated due to deceleration. When the vehicle is traveling in the power generation suppression area (S218: YES), the process proceeds to step S219. On the other hand, when the vehicle is not traveling in the power generation suppression area (S218: NO), the process proceeds to step S220.

Step S219

The control unit 14 executes power generation that does not take into account regeneration (power generation) after the vehicle has traveled through the power generation suppression area. Generally, in the power generation suppression area, the storage rate of the battery 41 is lowered in advance by suppressing power generation while traveling in the area so that the electrical energy that can be expected to be acquired thereafter can be efficiently recovered. In the present embodiment, power generation is executed without suppressing power generation while traveling in the power generation suppression area, which is normally suppressed. This allows for the efficient recovery of electrical energy that can be expected to be acquired after the power generation suppression area, as well as the generation of highly efficient electrical energy from power generation while traveling in the power generation suppression area. Once power generation that does not take into account regeneration after traveling in the power generation suppression area is executed, the process proceeds to step S220.

Step S220

The control unit 14 determines whether the vehicle has arrived at the destination point. When the vehicle has arrived at the destination point (S220: YES), the process proceeds to step S201 to generate the driving scenario to the next destination point. On the other hand, when the vehicle has not yet arrived at the destination point (S220: NO), the process proceeds to step S213 to reconsider whether the current driving scenario needs to be revised.

Figure 3A:
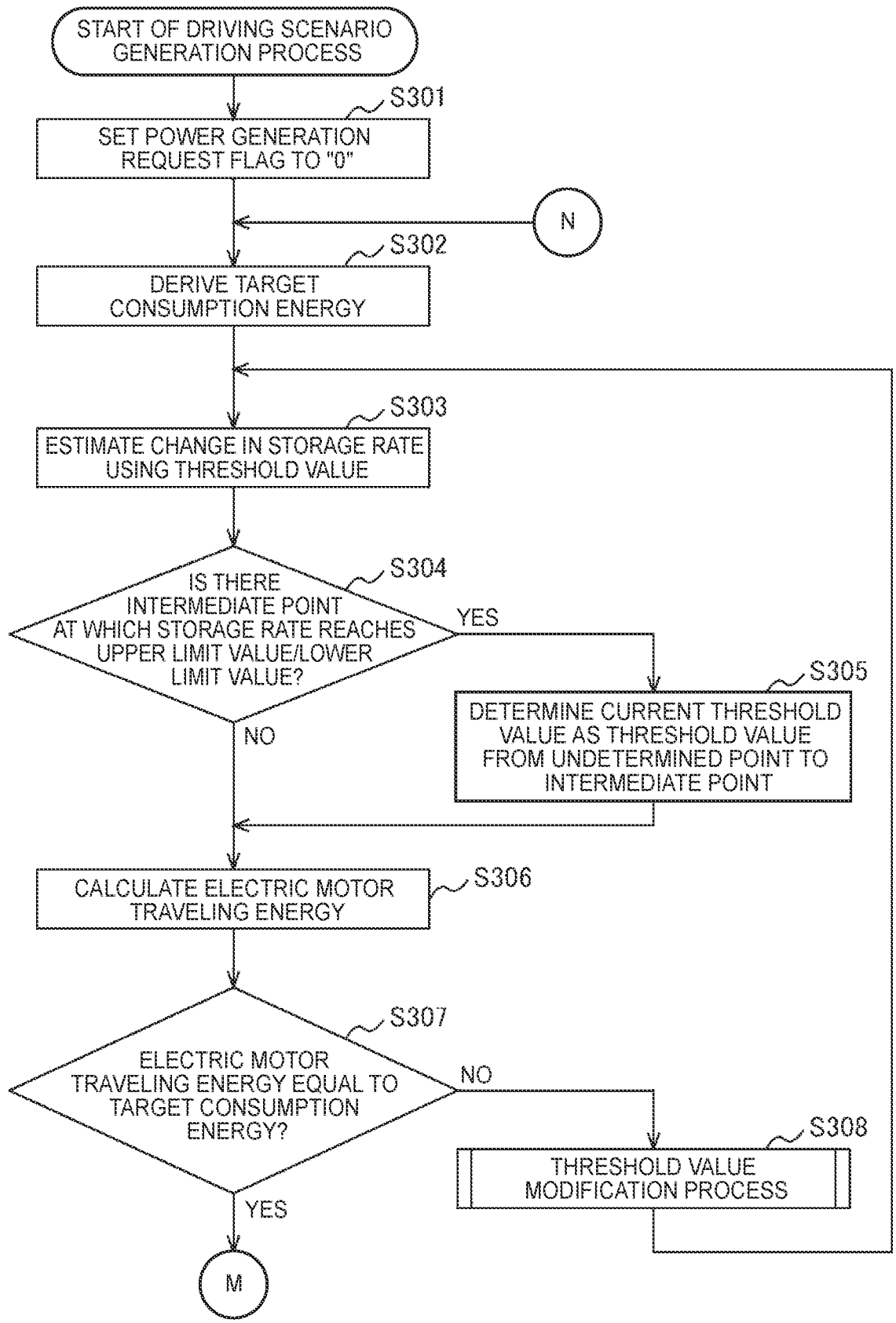
FIG. 3A is a flowchart of an example of a driving scenario generation process executed by the traveling control device.
Figure 3B:
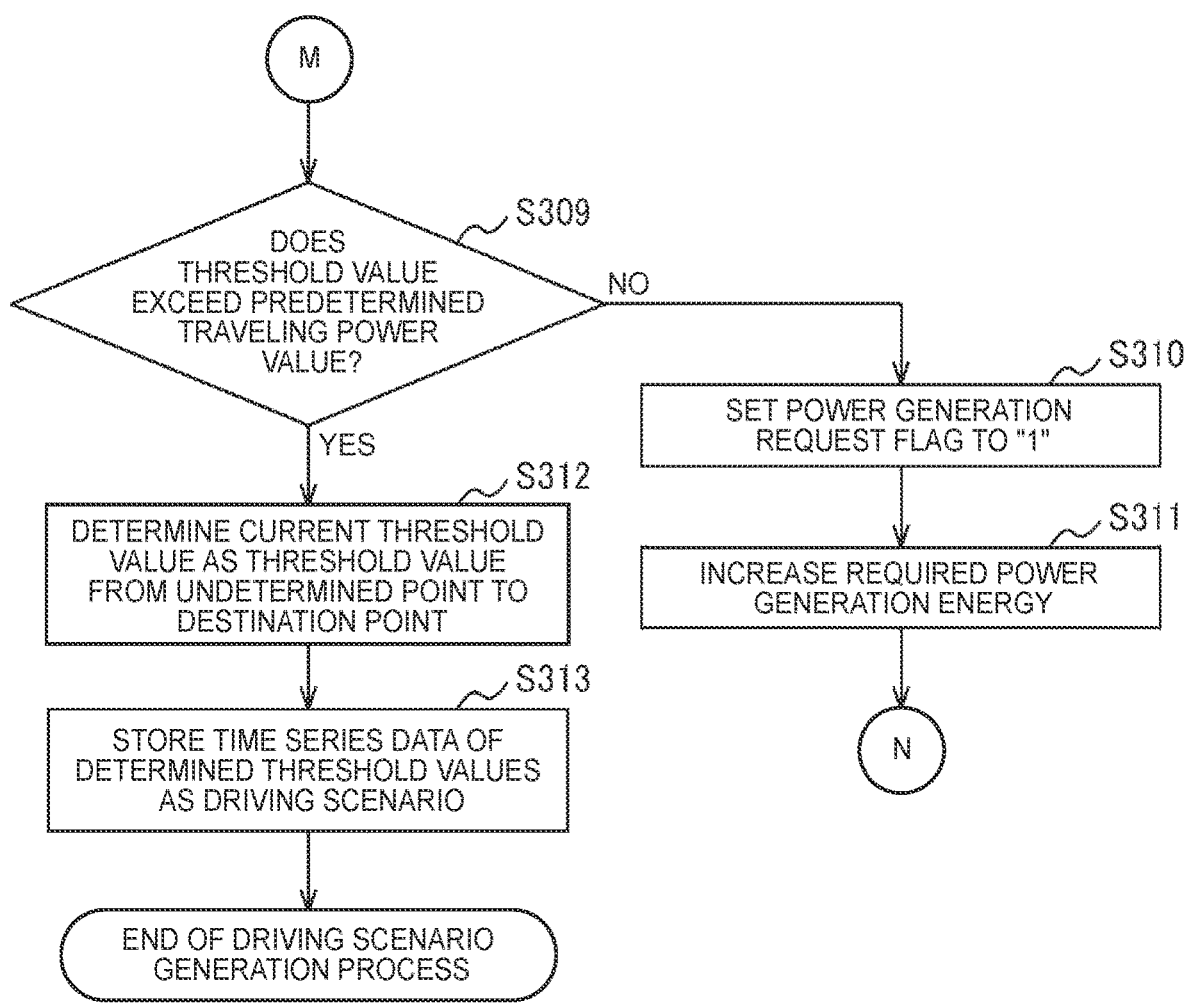
FIG. 3B is a flowchart of an example of the driving scenario generation process executed by the traveling control device.

Referring to FIGS. 3A and 3B, the driving scenario generation process shown in step S210 of FIG. 2A will be explained. FIGS. 3A and 3B are flowcharts showing an example of the driving scenario generation process executed by the traveling control device 10. The processes of FIG. 3A and the processes of FIG. 3B are connected by connectors M and N.

Step S301

The setting unit 13 initializes the power generation request flag XF by setting it to "0". Once the power generation request flag XF is set to "0", the process proceeds to step S302.

Step S302

The setting unit 13 derives a target consumption energy E_tgt. The target consumption energy E_tgt is the electrical energy expended in traveling of the vehicle to bring the storage rate of the battery 41 to the target storage rate SOC_tgt at the time of arrival of the vehicle at the destination point. The target consumption energy E_tgt is derived by the following equation [2] based on the estimated regenerative energy E_est, the estimated generative energy E_gen, the required power generation energy E_req, the initial storage rate SOC_stt, and the fully charged capacity C_f of the battery 41. Once the target consumption energy E_tgt is derived, the process proceeds to step S303.

$$E\_tgt = E\_est + E\_gen + E\_req + (SOC\_stt - SOC\_tgt) \times C\_f \quad \ldots \quad [2]$$

Step S303

The setting unit 13 applies a threshold value P_swt to the traveling power profile to estimate the change in the storage rate SOC_clc of the battery 41 expected from the current point to the time of arrival of the vehicle at the destination point. The threshold value P_swt is a value of the traveling power that gives the timing to switch between the first section in which only the electric motor 31 is driven for vehicle traveling as described above and the second section in which at least the internal combustion engine 21 is driven for vehicle traveling, and can be a value between zero and a maximum power that can be output by the vehicle. For the threshold value P_swt, an initial value in which the low traveling power area with reduced efficiency of the internal combustion engine 21 is the first section is set in advance, and this initial value is modified as appropriate in accordance with the content of the process. The current point is the vehicle's departure point in the driving scenario generation process performed during the initial setting time. Once the change in the storage rate SOC_clc of the battery 41 is estimated, the process proceeds to step S304.

Figure 9:
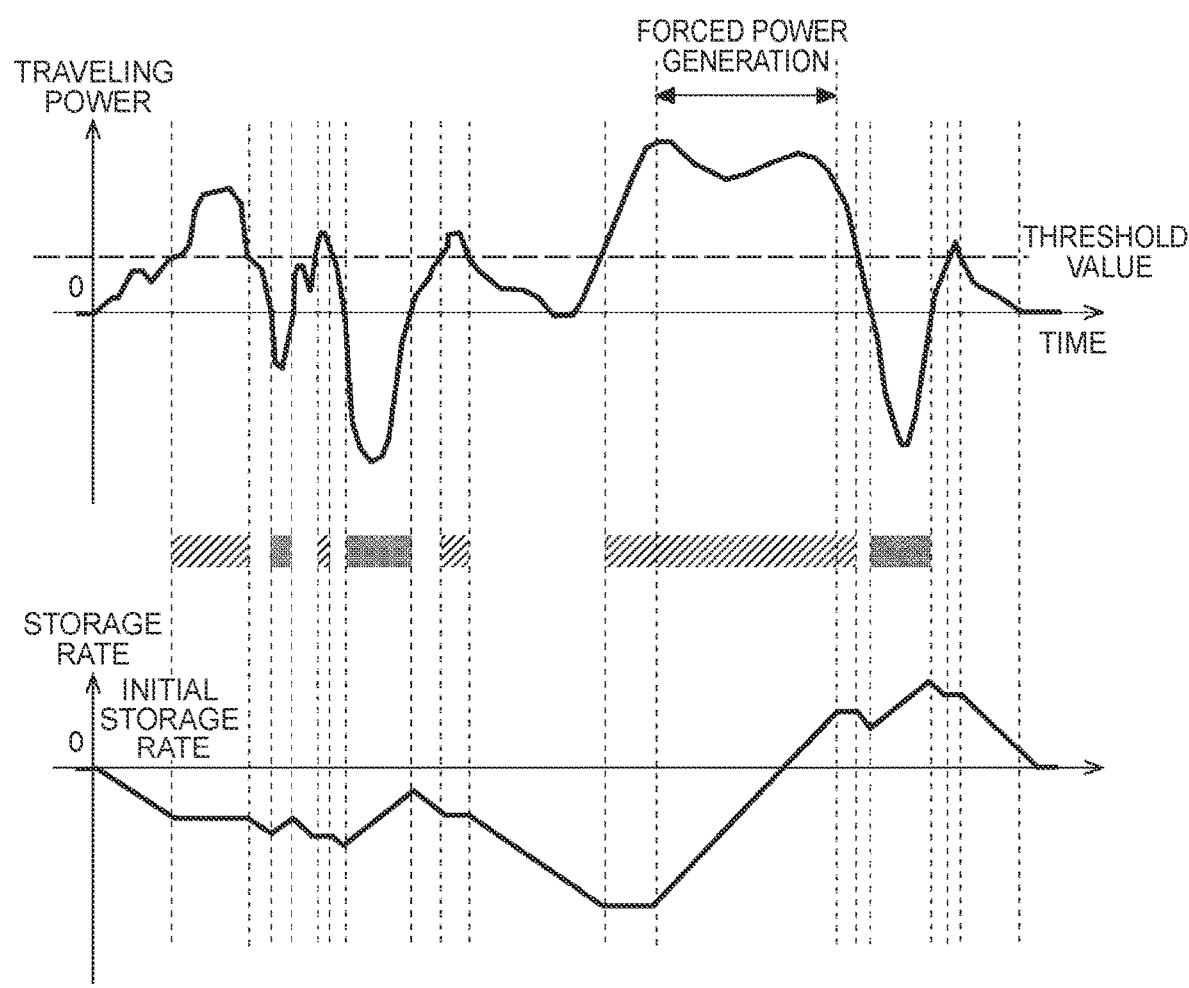
FIG. 9 is a diagram showing an example of changes in a storage rate of a battery (without a target storage rate)
Figure 10:
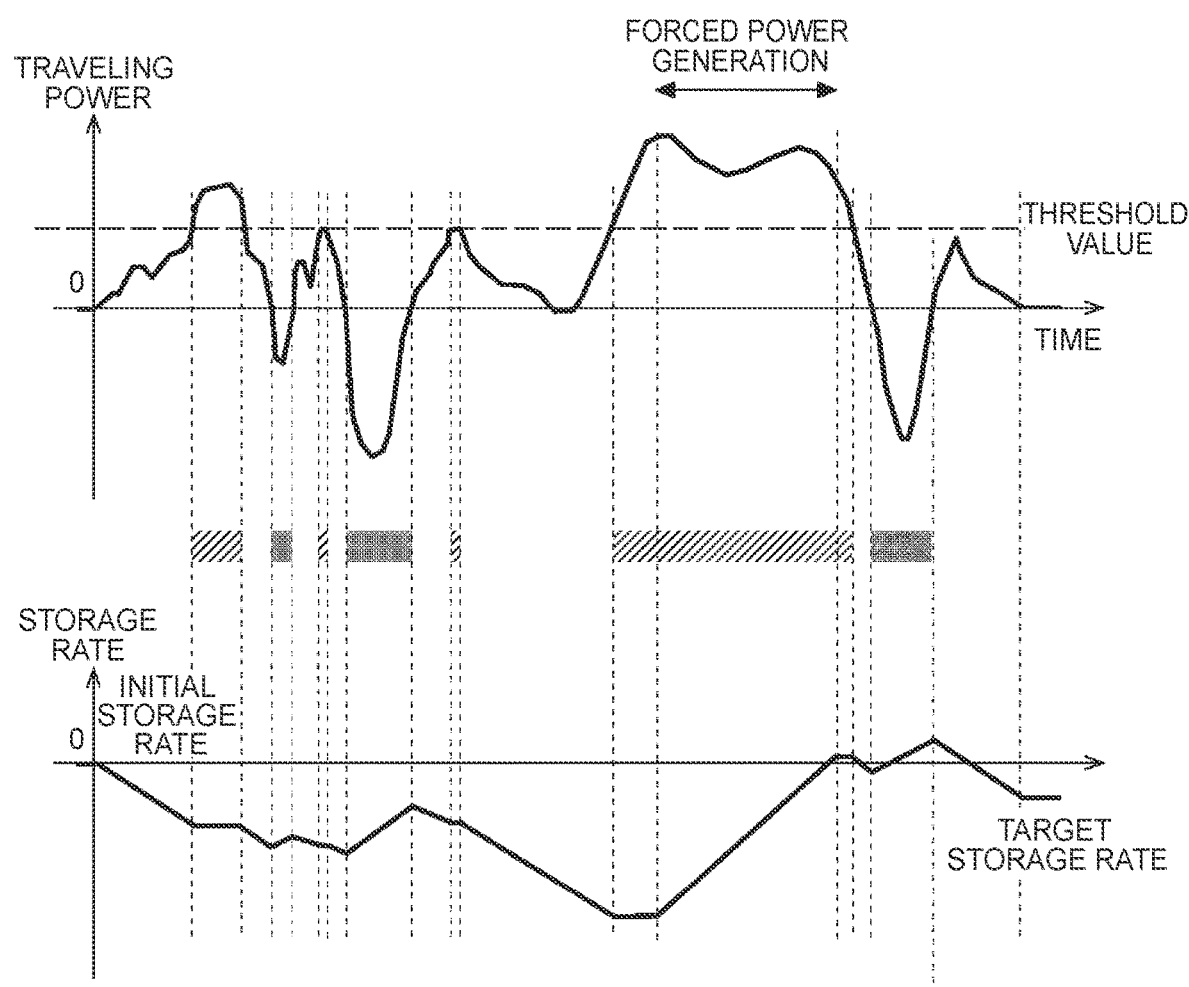
FIG. 10 is a diagram showing an example of changes in the storage rate of the battery (including the target storage rate)

An example of the change in the storage rate SOC_clc of the battery 41 estimated based on the traveling power is shown in FIGS. 9 and 10. FIG. 9 shows an example of the change in the storage rate SOC_clc of the battery 41 in the case where there is no target storage rate SOC_tgt at the destination point. FIG. 10 shows an example of the change in the storage rate SOC_clc of the battery 41 in the case where there is the target storage rate SOC_tgt at the destination point.

As illustrated in FIGS. 9 and 10, in the first section of the traveling power profile where the traveling power is equal to or larger than zero and equal to or smaller than the threshold value (the period that is neither hatched nor shaded in the figures), electric power is consumed by the power running control of the electric motor 31, so that the storage rate SOC_clc of the battery 41 decreases. On the other hand, in the first section where the traveling power is smaller than zero (the hatched period in the figures), the electric motor 31 performs regenerative braking, so that electric power is charged and the storage rate SOC_clc of the battery 41 increases. In the second section where the traveling power exceeds the threshold value in the traveling power profile (the shaded period in the figures), in principle, there is no power consumption by the electric motor 31, so that the storage rate SOC_clc of the battery 41 is maintained. However, during the period when high-speed traveling is performed, the storage rate SOC_clc of the battery 41 increases due to charging by forced power generation.

Step S304

The setting unit 13 determines whether there is an intermediate point at which the storage rate SOC_clc reaches the upper limit value or the lower limit value allowed for the battery 41, in the estimated change in the storage rate SOC_clc of the battery 41 from the current point to the destination point. The allowable upper limit value of the battery 41 is, for example, the storage rate at which the battery 41 is overcharged, and the allowable lower limit value of the battery 41 is, for example, the storage rate at which the battery 41 is overdischarged. When there is an intermediate point where the storage rate SOC_clc reaches the allowable upper limit value or the allowable lower limit value (S304: YES), the process proceeds to step S305. When there is no intermediate point where the storage rate SOC_clc reaches the allowable upper limit value or the allowable lower limit value (S304: NO), the process proceeds to step S306.

Step S305

The setting unit 13 determines (fixes) the current threshold value P_swt as the regular threshold value to be applied from an undetermined point of the threshold value to the intermediate point. The undetermined point of the threshold value in this step is the current point when the current intermediate point is the intermediate point where the storage rate SOC_clc first reaches the allowable upper limit value or the allowable lower limit value of the battery 41, and is the previous intermediate point when the current intermediate point is the intermediate point where the storage rate SOC_clc reaches the allowable upper limit value or the allowable lower limit value of battery 41 for the second time or more. There is no limit to the number of intermediate points. Once the threshold value from the undetermined point to the intermediate point is determined, the process proceeds to step S306.

Step S306

The setting unit 13 calculates the estimation value of the electric motor traveling energy E_mg that is consumed by the electric motor 31 from the current point until the vehicle arrives at the destination point, based on the storage rate SOC_clc of the battery 41 with its change estimated. The electric motor traveling energy E_mg is calculated based on the integration value of the traveling power in the first section where the traveling power is equal to or larger than zero in the traveling power profile to which the current threshold value P_swt is applied. When there is a threshold value determined in step S305 above, the current threshold value P_swt and the determined threshold value are applied to each of the relevant periods to calculate the electric motor traveling energy E_mg. Once the electric motor traveling energy E_mg is calculated, the process proceeds to step S307.

Step S307

The setting unit 13 determines whether the electric motor traveling energy E_mg is equal to the target consumption energy E_tgt (E_mg=E_tgt). This determination is made to determine whether the target consumption energy E_tgt is consumed without excess or deficiency at the current threshold value P_swt. When the electric motor traveling energy E_mg is equal to the target consumption energy E_tgt (S307: YES), the process proceeds to step S309. On the other hand, when the electric motor traveling energy E_mg is not equal to the target consumption energy E_tgt (S307: NO), the process proceeds to step S308.

Step S308

The setting unit 13 performs a process to modify the current threshold value P_swt (threshold value modification process). This threshold value modification process will be described later. Once the threshold value P_swt is modified, the process proceeds to step S303.

Step S309

The setting unit 13 determines whether the current threshold value P_swt exceeds a predetermined traveling power value C_p. The value C_p indicates the traveling power at which the efficiency of the internal combustion engine 21 decreases, and the current threshold value P_swt being equal to or lower than this value indicates the need to increase the amount of power generation. When the threshold value P_swt exceeds the value C_p (S309: YES), the process proceeds to step S312. On the other hand, when the threshold value P_swt does not exceed the value C_p (S309: NO), the process proceeds to step S310.

Step S310

The setting unit 13 sets the power generation request flag XF to "1". When the power generation request flag XF is set to "1", the process proceeds to step S311.

Step S311

The setting unit 13 increases the required power generation energy E_req. More specifically, the setting unit 13 adds a very small amount of energy ΔE to the previous required power generation energy E_req to increase the required power generation energy E_req (E_req←E_req+ΔE). The very small amount of energy ΔE can be set to any value based on the speed and resolution required for this process. Once the required power generation energy E_req is increased, the process proceeds to step S302.

Step S312

The setting unit 13 determines (fixes) the current threshold value P_swt as the regular threshold value to be applied from the undetermined point of the threshold value to the destination point. The undetermined point of the threshold value in this step is the current point when the storage rate SOC_clc changes without ever reaching the allowable upper limit value or the allowable lower limit value of the battery 41, and is the intermediate point at which the allowable upper limit value or the allowable lower limit value was reached last when the storage rate SOC_clc reaches the allowable upper limit value or the allowable lower limit value of the battery 41 at least once. Once the threshold value from the undetermined point to the destination point is determined, the process proceeds to step S313.

Step S313

The setting unit 13 generates data connecting in time series the one or more threshold values determined in steps S305 and S312, and stores the generated data as the driving scenario to be applied to traveling from the current point until the vehicle arrives at the destination point. Once the driving scenario is stored, this driving scenario generation process is completed.

Figure 4:
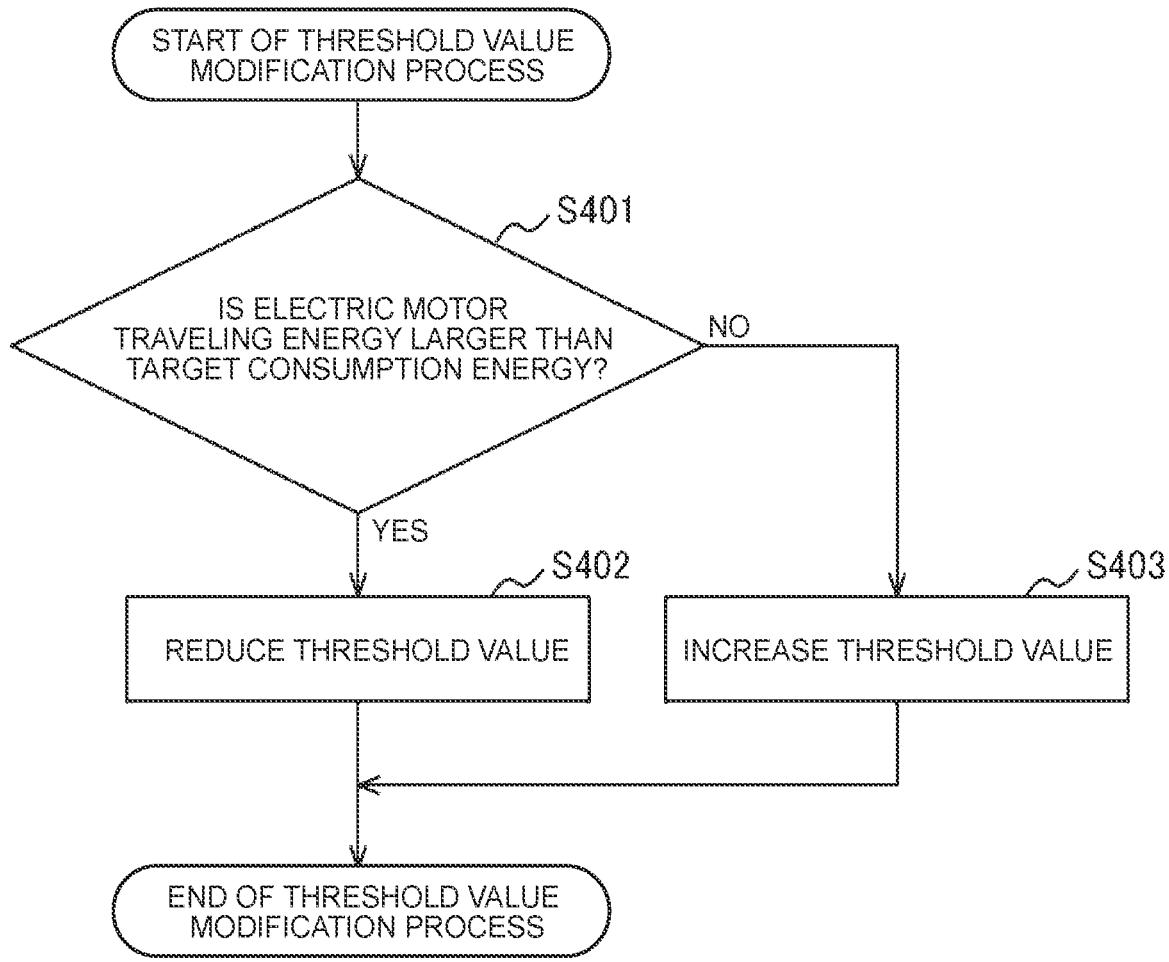
FIG. 4 is a flowchart of an example of a threshold value modification process executed by the traveling control device.

FIG. 4 illustrates the threshold value modification process shown in step S308 of FIG. 3A. FIG. 4 is a flowchart of an example of the threshold value modification process executed by the traveling control device 10.

Step S401

The setting unit 13 determines whether the electric motor traveling energy E_mg is larger than the target consumption energy E_tgt (E_mg>E_tgt). This determination is made to determine how the threshold value P_swt should be modified. When the electric motor traveling energy E_mg is larger than the target consumption energy E_tgt (S401: YES), the process proceeds to step S402. On the other hand, when the electric motor traveling energy E_mg is not larger than the target consumption energy E_tgt (S401: NO), the process proceeds to step S403.

Step S402

The setting unit 13 reduces the threshold value P_swt because even when all the estimated regenerative energy E_est is consumed, electrical energy is sufficient. Specifically, the setting unit 13 changes the current threshold value P_swt to a value that is reduced by a small amount of power ΔP (P_swt←P_swt−ΔP). The small amount of power ΔP can be set to any value based on the performance of the power source, the difference between the electric motor traveling energy E_mg and the target consumption energy E_tgt, and the like. As a method for reducing the threshold value P_swt in step S402, other than the method of reducing the threshold value P_swt by the fixed value of the power ΔP as described above, a method of setting an intermediate value between the current threshold value P_swt and a lower limit threshold value P_swt_min, which is the minimum threshold value that can be set, as the modified threshold value (P_swt←(P_swt+P_swt_min)/2) may be used (binary search method). Once the threshold value P_swt is reduced, this threshold value modification process is completed.

Step S403

The setting unit 13 increases the threshold value P_swt because all of the estimated regenerative energy E_est cannot be consumed. Specifically, the setting unit 13 changes the current threshold value P_swt to a value that is increased by a small amount of power ΔP (P_swt←P_swt+ΔP). The small amount of the power ΔP can be set to any value based on the performance of the power source, the difference between the electric motor traveling energy E_mg and the target consumption energy E_tgt, and the like. In addition, as a method for increasing the threshold value P_swt in step S403, other than the method for increasing the threshold value P_swt by the fixed value of the power ΔP described above, a method of setting an intermediate value between the current threshold value P_swt and the upper limit threshold value P_swt_max, which is the maximum threshold value that can be set, as the modified threshold value (P_swt←(P_swt+P_swt_max)/2) may be used (binary search method). Once the threshold value P_swt is increased, this threshold value modification process is completed.

Note that when generating the driving scenario, depending on the acquired traveling power profile, the speed profile, and the initial storage rate SOC_stt, there is a possibility that both of full consumption of the estimated regenerative energy E_est and acquisition of the target storage rate SOC_tgt at the time of arrival at the destination point cannot be established. In such a case, either one of full consumption of the estimated regenerative energy E_est and acquisition of the target storage rate SOC_tgt at the time of arrival at the destination point may be prioritized to generate the driving scenario. The driving scenario may be generated with priority given to the fact that the storage rate SOC_clc does not reach the allowable upper limit value or the allowable lower limit value.

Figure 11:
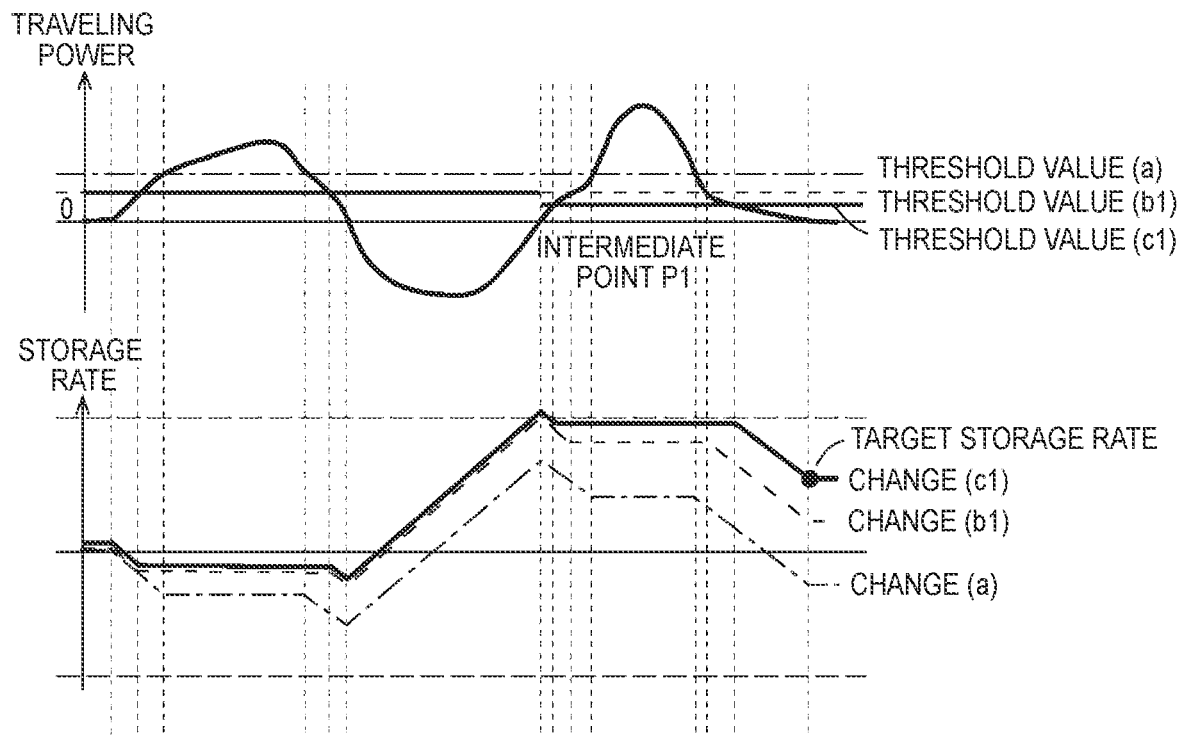
FIG. 11 is a diagram showing an example of a method for determining a threshold value (limitation by allowable upper limit value)
Figure 12:
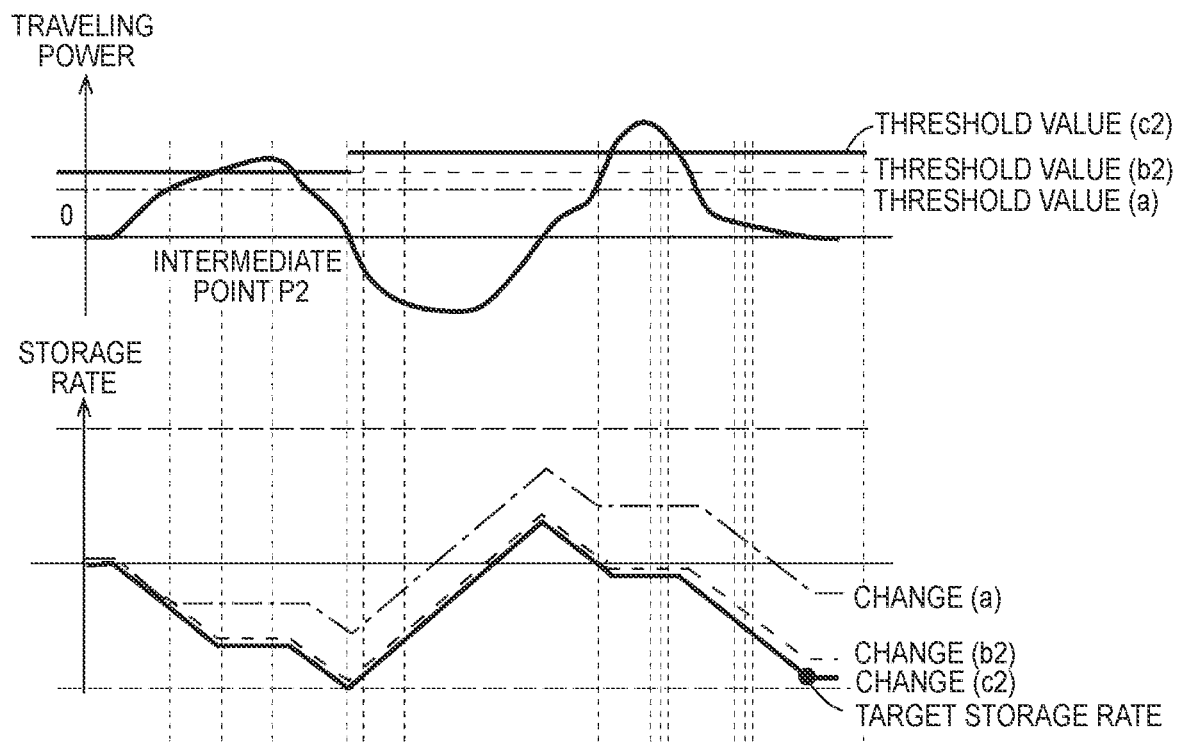
FIG. 12 is a diagram showing an example of the method for determining the threshold value (limitation by allowable lower limit value).

FIGS. 11 and 12 show an example of a method for determining the threshold value P_swt used for the driving scenario. FIG. 11 is a diagram illustrating an example where there is an intermediate point at which the storage rate SOC_clc reaches the allowable upper limit value of the battery 41. FIG. 12 is a diagram illustrating an example where there is an intermediate point at which the storage rate SOC_clc reaches the allowable lower limit value of the battery 41.

In FIG. 11, the threshold value (a), which is the initial value of the threshold value P_swt, is first applied to the traveling power profile to estimate the change (a) in the storage rate SOC_clc of the battery 41. However, with this change (a), the target storage rate SOC_tgt cannot be obtained at the time of arrival at the destination point, so the threshold value P_swt is modified and reduced to the threshold value (b1). Even with this threshold value (b1), the target storage rate SOC_tgt cannot be obtained, but there is the intermediate point P1 at which the storage rate SOC_clc reaches the allowable upper limit value, so that the threshold value from the departure point to the intermediate point P1 is determined to be the threshold value (b1). Finally, from the intermediate point P1 to the destination point, the threshold value (c1) is determined resulting in the change (c1) with which the target storage rate SOC_tgt can be obtained at the time of arrival at the destination point. With this method, a driving scenario is generated in which the switching control of the traveling mode is performed based on the threshold value (b1) for the time from the departure point to the intermediate point P1, and the switching control of the traveling mode is performed based on the threshold value (c1) for the time from the intermediate point P1 to the destination point.

In FIG. 12, the threshold value (a), which is the initial value of the threshold value P_swt, is first applied to the traveling power profile to estimate the change (a) in the storage rate SOC_clc of the battery 41. However, with this change (a), the target storage rate SOC_tgt cannot be obtained at the time of arrival at the destination point, so the threshold value P_swt is modified and increased to the threshold value (b2). Even with this threshold value (b), the target storage rate SOC_tgt cannot be obtained, but there is the intermediate point P2 at which the storage rate SOC_clc reaches the allowable lower limit value, so that the threshold value from the departure point to the intermediate point P2 is determined to be the threshold value (b2). Finally, from the intermediate point P2 to the destination point, the threshold value (c2) is determined resulting in the change (c2) with which the target storage rate SOC_tgt can be obtained at the time of arrival at the destination point. With this method, a driving scenario is generated in which the switching control of the traveling mode is performed based on the threshold value (b2) for the time from the departure point to the intermediate point P2, and the switching control of the traveling mode is performed based on the threshold value (c2) for the time from the intermediate point P2 to the destination point.

With the processes described above, it is possible to estimate changes in the power consumption per trip of the vehicle traveling from the departure point to the destination point, and the amount of the regenerative energy E_est recovered and the highly efficient generative energy E_gen, so that based on these factors, a driving scenario can be generated that can improve fuel efficiency while establishing both efficient consumption of the target consumption energy E_tgt including full consumption of the estimated regenerative energy E_est, and acquisition of the target storage rate SOC_tgt at the time of arrival of the vehicle at the destination point. When the deviation between the estimated value and the value obtained by actual traveling increases, the driving scenario is reviewed, so that optimal traveling control can always be achieved.

Operations and Effects

As described above, according to the traveling control device 10 for the vehicle of the present embodiment, the amount of regenerative energy E_est recovered is quantitatively estimated at an early stage using the traveling power profile, which is a time series of changes in the traveling power generated by the power source expected in the vehicle traveling from the departure point to the destination point, based on the past traveling history. In addition, the generative energy E_gen obtained by high efficiency power generation during traveling at high speeds is estimated using the speed profile, which is a time series of the speed of the vehicle expected in the vehicle traveling from the departure point to the destination point. Therefore, these estimation results can be used to perform suitable vehicle traveling control that takes into account the target storage rate of the battery 41.

The traveling control device 10 performs control so that the internal combustion engine 21 can be driven in a high-efficiency area as much as possible by using the electric motor 31 for traveling under traveling conditions with poor engine efficiency. When the regenerative energy can be estimated to be large, such as on a downhill slope, the traveling control device 10 performs control so as to reduce the storage rate of the battery 41 in advance to eliminate or reduce unrecovered energy. In addition, the traveling control device 10 performs control so as to actively generate electric power during high-speed traveling with good engine efficiency, thereby increasing the period during which the vehicle can travel by the electric motor 31, which can improve fuel efficiency/electric power efficiency. Furthermore, since the traveling control device 10 controls the traveling mode by setting the first section and the second section so that the storage rate of the battery 41 does not exceed the allowable upper limit value and does not fall below the allowable lower limit value, the progress of deterioration of the battery 41 can be suppressed. These controls can suitably improve fuel efficiency while establishing both efficient consumption of the target consumption energy E_tgt including full consumption of the estimated regenerative energy E_est, and acquisition of the target storage rate SOC_tgt at the time of arrival of the vehicle at the destination point.

Although the embodiment of the present disclosure has been described above, the present disclosure can be implemented with modifications as appropriate. The present disclosure can be understood not only as a traveling control device, but also as a traveling control method executed by a traveling control device including a processor and a memory, a traveling control program, a computer-readable non-transitory storage medium storing a traveling control program, a vehicle equipped with a traveling control device, and the like.

The present disclosure is useful for a traveling control device mounted on a vehicle and the like.

What is claimed is:

1. A traveling control device mounted on a vehicle equipped with an electric motor and an internal combustion engine as a power source, the traveling control device comprising:
   a first acquisition unit that acquires a destination point of the vehicle;
   a second acquisition unit that acquires past traveling history from a departure point to the destination point;
   a third acquisition unit that acquires a target storage rate that is a storage rate of a battery installed in the vehicle to be targeted at a time of arrival of the vehicle at the destination point;
   an estimation unit that estimates, based on the traveling history, an expected amount of generative energy that is energy able to be generated in the vehicle until the vehicle arrives at the destination point;
   a setting unit that sets a first section and a second section based on the expected amount of the generative energy and the target storage rate, the first section being a section in which only the electric motor is driven for traveling, and the second section being a section in which at least the internal combustion engine is driven for traveling;
   a control unit that controls traveling of the vehicle based on the first section and the second section; and
   a derivation unit that derives a difference between a time-integrated value of a magnitude of power generated in the power source based on the traveling history to a current point and a time-integrated value of a magnitude of power generated in the power source based on actual traveling to the current point, wherein when an absolute value of the difference derived by the derivation unit is equal to or greater than a predetermined standard value, the setting unit resets the first section and the second section from the current point to the destination point.

2. The traveling control device according to claim 1, wherein the traveling history includes information indicating a time series of changes in power generated in the power source when traveling was performed from the departure point to the destination point in the past, and information indicating a time series of changes in a speed of the vehicle when traveling was performed from the departure point to the destination point.

3. The traveling control device according to claim 2, wherein the estimation unit considers a period in the traveling history during which power generated in the power source is negative as a recovery period in which energy is able to be recovered, and estimates a time-integrated value of a magnitude of the power generated in the power source during the recovery period as at least a part of the expected amount of the generative energy.

4. The traveling control device according to claim 2, wherein the estimation unit considers a period in the traveling history during which the vehicle travels at a predetermined speed or more as a power generation period during which highly efficient power generation is able to be performed with driving of the internal combustion engine, and estimates energy generated during the power generation period as at least a part of the expected amount of the generative energy.

5. The traveling control device according to claim 1, wherein the setting unit sets the first section and the second section such that all of the expected amount of the generative energy is consumed at the time of arrival of the vehicle at the destination point.

6. The traveling control device according to claim 1, wherein the setting unit sets the first section and the second section such that the storage rate of the battery does not exceed an allowable upper limit value or does not fall below an allowable lower limit value.

7. A traveling control method executed by a traveling control device mounted on a vehicle equipped with an electric motor and an internal combustion engine as a power source, the traveling control method comprising:

a step of acquiring a destination point of the vehicle;

a step of acquiring past traveling history from a departure point to the destination point;

a step of acquiring a target storage rate that is a storage rate of a battery installed in the vehicle to be targeted at a time of arrival of the vehicle at the destination point;

a step of estimating, based on the traveling history, an expected amount of generative energy that is energy able to be generated in the vehicle until the vehicle arrives at the destination point;

a step of setting a first section and a second section based on the expected amount of the generative energy and the target storage rate, the first section being a section in which only the electric motor is driven for traveling, and the second section being a section in which at least the internal combustion engine is driven for traveling;

a step of controlling traveling of the vehicle based on the first section and the second section;

a step of deriving a difference between a time-integrated value of a magnitude of power generated in the power source based on the traveling history to a current point and a time-integrated value of a magnitude of power generated in the power source based on actual traveling to the current point, and a step of resetting the first section and the second section from the current point to the destination point when an absolute value of the difference is equal to or greater than a predetermined standard value.

8. A non-transitory storage medium storing a traveling control program executed by a computer of a traveling control device mounted on a vehicle equipped with an electric motor and an internal combustion engine as a power source, the traveling control program comprising:

a step of acquiring a destination point of the vehicle;

a step of acquiring past traveling history from a departure point to the destination point;

a step of acquiring a target storage rate that is a storage rate of a battery installed in the vehicle to be targeted at a time of arrival of the vehicle at the destination point;

a step of estimating, based on the traveling history, an expected amount of generative energy that is energy able to be generated in the vehicle until the vehicle arrives at the destination point;

a step of setting a first section and a second section based on the expected amount of the generative energy and the target storage rate, the first section being a section in which only the electric motor is driven for traveling, and the second section being a section in which at least the internal combustion engine is driven for traveling;

a step of controlling traveling of the vehicle based on the first section and the second section;

a step of deriving a difference between a time-integrated value of a magnitude of power generated in the power source based on the traveling history to a current point and a time-integrated value of a magnitude of power generated in the power source based on actual traveling to the current point, and a step of resetting the first section and the second section from the current point to the destination point when an absolute value of the difference is equal to or greater than a predetermined standard value.

* * * * *